Oct. 11, 1966 R. W. GUNDLACH 3,278,302
PHOSPHORESCENT SCREEN REFLEX
Filed Jan. 2, 1962

INVENTOR.
ROBERT W. GUNDLACH
BY Stanley Z Cole
ATTORNEY

United States Patent Office 3,278,302
Patented Oct. 11, 1966

3,278,302
PHOSPHORESCENT SCREEN REFLEX
Robert W. Gundlach, Victor, N.Y., assignor to Xerox Corporation, Rochester, N.Y., a corporation of New York
Filed Jan. 2, 1962, Ser. No. 163,827
9 Claims. (Cl. 96—1)

This invention relates to image reproduction and, in particular, to reflex exposure of photosensitive layers using a phosphorescent source of illumination.

In photography, xerography as disclosed for example by Carlson in U.S. 2,297,691 and other image reproduction arts where a photosensitive layer is exposed to an illumination pattern, the exposure is commonly made through a camera or similar apparatus. Such cameras are both expensive and bulky. The expense is largely attributable to the cost of the optics necessary for fine quality reproductive work. The bulk is a result of the spacing required between the original to be reproduced and the sensitive layer in order to utilize a conventional optical system. To avoid the optical system, it is essential that the light image originate virtually adjacent to the sensitive layer. Otherwise, excessive loss of resolution results. Several methods for performing this function have been successfully utilized. One such method is to illuminate the original through the sensitive layer so that a light image is reflected onto the sensitive layer from the original. The source of illumination may also be directed from the other side through the original which partially blocks the illumination permitting an illumination pattern only to reach the sensitive layer. In these two processes the original and the sensitive layer are conventionally placed immediately adjacent to each other and a good quality of resolution is obtained. However, when the source of illumination is directed through the sensitive layer, the resulting over-all exposure of the sensitive layer reduces its efficiency and its contrast capabilities. When the light is directed through the original, the characteristics of the original have an excessive effect on the reproduced image, and of course, it is impossible to use this latter process with an opaque or two sided original. Further processes which have been tried include introducing a source of illumination between the sensitive layer and the original. Such a source of illumination has a luminescent or phosphorescent layer providing the necessary light without the necessity of passing light through either the original or the sensitive layer. However, contrast is reduced considerably due to the difficulty of avoiding undesired illumination of the sensitive layer.

Now in accordance with the present invention, a process has been discovered which avoids the contrast problems of previous methods. In addition in certain types of reproductions it is desirable to enhance the contrast of the original in the copy reproduced. In accordance with the present invention an increase in contrast beyond that existing in the original is obtainable. This result has been achieved by reflex use of a phosphorescent layer between the original to be reproduced and the sensitive layer in which the phosphorescent material is activated to correspond with the image and is then reflected onto a sensitive layer in correspondence with the image so that what may be called a double or additive contrast effect occurs. Thus, it is an object of the present invention to enhance the contrast obtainable by reflex exposure in image reproduction systems.

It is an additional object to define an inexpensive, compact, image exposure process yielding high contrast exposures.

It is an additional object to define a photographic exposure system using phosphorescent reflex.

It is an additional object to define a xerographic exposure system using phosphorescent reflex.

It is an additional object to define a process for using phosphorescent coated opaque screens as a source of illumination to provide enhanced contrast in image reproduction.

Further objects and features of the invention will become apparent while reading the following description in connection with the drawings wherein.

Figure 1:
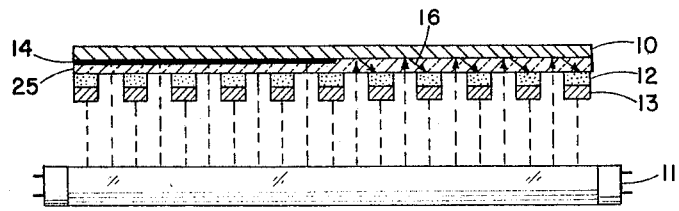
FIG. 1 is a diagrammatic illustration of activating a phosphorescent screen selectively in accordance with an image pattern.

Exposure of a photosensitive layer to an image pattern to be reproduced is performed in the embodiments of FIGS. 1–4 by two steps in the inventive process. The first of the two steps is to activate a source of illumination so that it radiates illumination discriminately in accordance with the image pattern. As illustrated in FIG. 1, this is accomplished by illuminating image original 10 by a source of illumination 11 so that the illumination is selectively reflected onto phosphorescent screen 12. The phosphorescent screen 12 is positioned adjacent to the image original and is backed on the non-adjacent side with opaque screen 13. Illumination from source 11 passes through the openings in the screen mesh but is blocked by opaque screen 13 from directly illuminating phosphorescent screen 12. Thus phosphorescent screen 12 is illuminated only indirectly by reflected illumination activating it into phosphorescence selectively in accordance with the image original. In the activation embodiment shown in FIG. 1, the image original is suitably an image pattern on an opaque backing. As illustrated in the figure, the image pattern is represented by the dark area 14. With a black image on a white background, light would be reflected in the background areas onto the phosphorescent screen as indicated by the arrows "16" while the light reaching the image areas would be absorbed allowing little reflection. With other types of images, colored or shaded, or even white on a black background, activation of the phosphorescent screen will still be selective in accordance with the image pattern showing variations in accordance with the reflectivity of the image areas. In the case of a white image on a black background, activation of the phosphorescent screen would be in the image areas while light reaching the background areas would be absorbed.

Figure 2:
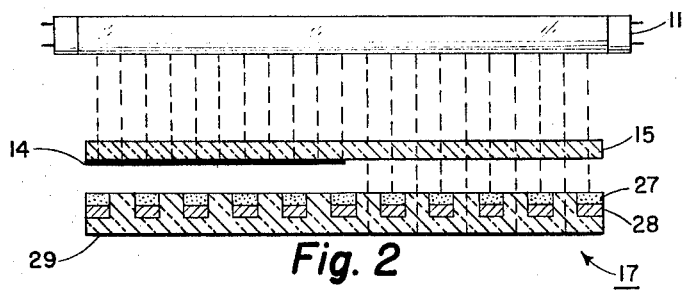
FIG. 2 is a diagrammatic illustration of a second embodiment of activation of a phosphorescent screen.

FIG. 2 shows an embodiment of the method of selectively activating phosphor screen member 17 which may be used with a transparent or translucent original. In FIG. 2, illumination from source 11 is directed through the image original 15 from one side. The other side of image original 15 is positioned adjacent to a phosphor screen member 17. Illumination passing through the image original 15 is absorbed by image areas 14 while in the non-image areas, it passes through to activate the phosphor screen member 17. Thus in the embodiment of FIG. 2, the phosphor screen is activated by direct illumination rather than reflected illumination.

Figure 3:
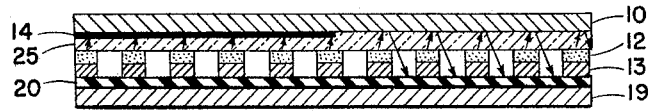
FIG. 3 is a diagrammatic illustration showing reflex illumination of a light sensitive member using the selectively activated phosphorescent screen of FIG. 1.

After the phosphor screen has been activated selectively in accordance with the image pattern, it may be used directly to expose a photosenstive layer. Thus the selectively activated phosphorescent screen 12 of FIG. 1 could be positioned in a darkened enclosure in face to face relation with an unexposed photographic film and would expose the film selectively in accordance with the image pattern. However, a contrast improvement is obtained by leaving the image original 10 adjacent to the selectively activated phosphorescent screen 12 while a photosensitive layer is positioned adjacent to the opaque screen 13 opposite the position of the image original 10. This is illustrated in FIG. 3 in which a sensitive xerographic plate 19 having a photoconductive insulating layer 20 is positioned with the layer 20 adjacent to the opaque screen 13. A method of sensitizing a xerographic plate is disclosed for example in Mayo U.S. 2,778,946. Illumination from the selectively activated phosphorescent screen 12 illuminates the image original 10 and is reflected selectively in accordance with the image pattern down through the screen mesh onto the photoconductive insulating layer 20. Electrical charges on the photoconductive insulating layer 20 are dissipated through the xerographic plate backing where layer 20 is illuminated. This illumination is carried on in the absence of outside light. After the necessary period of exposure, xerographic plate 19 can be removed and the latent electrostatic image thereon developed by conventional xerographic techniques. By the exposure process of FIG. 3, a phosphorescent screen which phosphoresces selectively in accordance with an image pattern illuminates and is selectively reflected by the same image pattern onto a photosensitive layer. Thus the photosensitive layer sees the additive effects of selective illumination and selective reflection, both being in accordance with the same pattern. The contrast in the electrostatic latent image is greatly enhanced over what would be the case if the screen had been uniformly activated and selectively reflected or on the other hand, selectively activated and used without reflection to illuminate the photosensitive layer.

Figure 4:
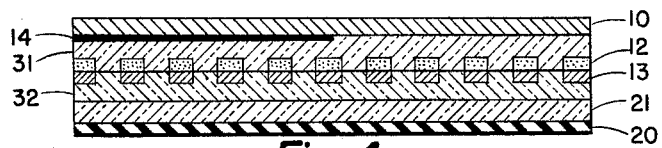
FIG. 4 is a diagrammatic illustration showing exposure of a xerographic plate to produce a direct reading image on the plate.

In the embodiment illustrated in FIG. 3, the electrostatic latent image produced on photoconductive insulating layer 20 would be, when developed, a mirror image of the original. Transferring the developed image to a separate sheet or transfer member would then produce a direct reading reproduction. FIG. 4 illustrates an exposure embodiment similar to that of FIG. 3 in which the electrostatic latent image produced on the photoconductive insulating layer is immediately developable as a direct reading image. In this embodiment phosphorescent 12 backed by an opaque screen 13 is selectively activated in accordance with either FIG. 1 or FIG. 2, and then a sensitive xerographic plate with a transparent backing or support layer is positioned with the backing side adjacent to opaque screen 13, the selective illumination from phosphorescent screen 12 is selectively reflected from image original 10 through the transparent backing of the xerographic plate to produce an electrostatic latent image on photoconductive insulating layer 20. A xerographic plate such as used in this embodiment may have a conductively coated glass backing 21 such as NESA glass and bearing a photoconductive insulating layer 20. Such a plate is disclosed in Bixby, U.S. 2,970,906 by way of example. The electrostatic latent image developable on the non-adjacent face of the xerographic plate would be a direct reading image.

In the embodiments of FIGS. 3 and 4, a photographic film can be used instead of xerographic plate as can any other photosenstive layer. In FIG. 3, the sensitive face of the photographic film would be positioned adjacent to opaque screen 13. In FIG. 4, the less sensitive side of the photographic film would be positioned adjacent to opaque screen 13.

The phosphorescent and opaque screens used in the present invention are subject to a wide variety of variations. Preferably, these screens form a unitary structure or layer which includes the opaque material forming the opaque screen, and phosphor material in a binder forming the phosphorescent screen. In some cases, a further material used as a supporting or spacing structure may also be employed. The screen shown in FIG. 1 can be formed with a metal screen having a mesh of about 50 to 300 lines per inch and with the openings in the screen covering between 20 and 90 percent of the surface area and preferably about 50 percent so that there is both adequate opening for light to pass through as well as adequate area for carrying phosphorescent material. The screen mesh is preferably about 100 to 200 lines per inch. A coarser mesh will either show the screen pattern in the reproduction or must be spaced to such an extent as to lower resolution. When the screen is made finer than 200 lines per inch, the phosphorescent material must be formed in such fine lines as to reduce its phosphorescent characteristics. The screen may be a woven mesh but is preferably a perforated sheet of an opaque material such as metals. Aluminum, brass or copper have been found suitable metals for the purpose.

The phosphorescent screen can be formed by depositing a layer of phosphorescent material on the opaque screen. For this purpose, the phosphorescent material is mixed with a binder material and sprayed, dipped or otherwise coated on the opaque screen. The phosphorescent material suitable for exposing an amorphous selenium xerographic plate preferably luminesces with a green or blue color characteristic. Phosphors number 2330, 2301 and 2479 manufactured by the New Jersey Zinc Company of New York city have been found suitable. Nite-Bright, manufactured by United Gisonite Labs of Scranton, Pennsylvania, is a phophor and binder mixture that has been used successfully. When reproducing onto a photographic photosensitive layer or photosensitive layer other than amorphous selenium, other types of phosphorescent phosphors suitable for the light characteristics of the photosensitive layer can be used. The phosphors are mixed with a binder material with a ratio of between 1 to 1 and 5 to 1 phosphor to binder by weight. Suitable binder materials are film forming binders such as polystyrene, polyethylene, polyester and acrylic type resins and the like. Suitable resins include but are not limited to polyethylene materials such as Dylan and Dylene (Koppers Co.) and Lustrex (Monsanto Chemical Co.); styrene acrylonitrile materials such as Tyril (Dow Chemical Co.); polyesters such as Hetron (Hooker Electrochemical Co.); phenol-formaldehyde resins such as Durez (Durez Plastics and Chemicals, Inc.); and acrylic resins such as Krylon (Krylon Inc.). A phosphor and binder mixture can be thinned to a suitable coating mixture by the addition of a solvent for the binders such as methylethylketone, benzene or other suitable solvent for the particular resin used. The phosphorescent mixture is coated on the opaque screen with a thickness preferably of the range between 1 and 2 mils in order to provide adequate phosphorescence.

The composite phosphorescent and opaque screens can then be bonded to a transparent plastic film such as a 1 mil thick cellulose acetate or polyethylene terephthalate resin. The transparent plastic film may be bonded either to the photophorescent material as illustrated in FIG. 1 or to the opaque material. The only limitation on the thickness of the opaque material and the transparent film is that when the composite structure is positioned between an original and a photosentitive layer as illustrated in FIG. 3, the spacing between the image-bearing surface of original 10 and the photosensitive layer 20 should be no more than about 3 mils. This limits the total thickness of the structure comprising the opaque screen, the phosphorescent screen, and any transparent film used to about 3 mils or less. A greater thickness will result in a noticeable loss of resolution in the reproduction due to the diffusion of light. Many other ways for forming the phosphorescent screen structure are contemplated. For example, a polyethylene terephthalate film of 2 mils thickness can be coated with aluminum by vacuum evaporation. The aluminum coating should be two-tenths of a micron or more thick. The aluminum coating can then be coated with a mixture of phosphorescent powder and photosensitive bi-chromated gelatin. Exposure to light through halftone contact screen will then render part of the phosphor gelatin layer insoluble in accordance with the screen pattern and the remainder of the layer may be washed away. The aluminum coating in the unprotected areas can then be etched away with acid leaving the desired screen structure. A further method of forming a phosphorescent screen structure is to cast a plastic film with a pattern of depressed areas forming holes or ditches in the film These holes or ditches may then be filled with the phosphor-binder mixture. When the phosphor mixture dries, it shrinks slightly permitting an application of opaque liquid by wiping it over the film surface so that it fills in the slightly recessed areas over the phosphorescent material. A still further process of making the phosphorescent screen structure is somewhat similar to a lithographic printing process. A thin hydrophilic film is coated over a cellulose acetate film and an oil base phosphorescent ink printed onto the hydrophilic coating. The member is then moistened and printer's ink applied which will only coat the water repellent luminous dots. In making these screens, the base or structural support layer may be a transparent plastic film or sheet of glass or it may be the opaque screen. The sequence of coating is not critical and many variations are possible as long as the opaque screen substantially blocks illumination in the opaque areas. It has been found desirable to space the phosphorescent material slightly from the original to permit some diffusion of light passing between them. This prevents the screen pattern from being reproduced objectionably. Also, as has been previously stated, the total thickness of the phosphorescent screen structure is preferably limited to about 3 mils in order to preserve resolution.

Some variations in the screen structures have been included in the drawings for purposes of illustration. FIGURES 1 and 3 illustrate the same structure which is a metal screen 13 joined to a phosphor screen 12 which in turn is joined to a transparent sheet 25. As illustrated sheet 25 is positioned adjacent to the original being reproduced. FIGURE 2 illustrates a transparent layer 29 with depressions arranged in a dot pattern. The depressed areas contain opaque deposits 28 and phosphor deposits 27. In this embodiment the uniform or undotted surface of the layer 29 is positioned non-adjacent to the original being reproduced. Opaque screen 13 and phosphor screen 12 illustrated in FIGURE 4 are sandwiched and embedded between two transparent layers 31 and 32. In FIGURE 4 there is thus transparent spacing material between the phosphorescent screen and both the original and the photo sensitive member.

The source of illumination 11 illustrated in the figures is preferably an ultra-violet lamp. Ultra-violet light is preferred since phosphorescent materials generally show greater sensitivity to ultra-violet radiation. Other types of illumination may be utilized but will generally require greater power and/or longer illumination time. The illumination reaching screen 13 in FIG. 1 or original 10 in FIG. 2 should be generally uniform. Appropriate combinations of reflectors, lenses and diffusers as known to the art are contemplated especially in the case of a point source of light.

After the phosphorescent screen structure has been used in one reproduction process, residual luminescence must be eliminated prior to reuse. Exposure to an infra-red lamp will operate for rapid quenching of residual luminescence.

The invention is of particular value where high contrast reproduction is desired such as in making masters for various duplicating processes and where the original has a weak contrast for which some enhancement is desired. It has general application and is particularly valuable in reproducing from line copy originals where contrasting reproductions are desired.

While the present invention has been described as carried out in specific embodiments thereof, there is no desire to be limited thereby, but it is intended to cover the invention broadly within the spirit and scope of the appended claims:

What is claimed is:

1. The process of exposing a photosensitive layer to an image illumination pattern comprising the steps of activating selective portions of a phosphorescent screen with illumination of an image original to effect an image pattern of phosphorescent illumination, and while substantially shielding the phosphorescent screen from direct exposure to said photosensitive layer deflecting the phosphorescent illumination from said screen against said image pattern and onto said photosensitive layer enhancing contrast in the image formed on said photosensitive layer.

2. A method of reflex exposure in an image reproducing process comprising the steps of activating a phosphorescent screen with light reflected from an original image being reproduced, removing the activating light source and positioning a photosensitive member to receive illumination emanating from the phosphor screen and reflected by the image being reproduced while being substantially shielded from direct exposure to said screen.

3. A method of image exposure in an image reproducing process comprising the steps of positioning a photoactive phosphor layer adjacent to a light permeable original being reproduced, illuminating the non-adjacent side of said light permeable original by a light source so that the light not absorbed by the image areas of said original passes through the original illuminating and activating the photoactive phosphor layer, and after discontinuing said last recited step substituting a photosensitive layer in place of said light source whereby light emanating from said photactive phosphor layer passes selectively through said original to expose said photosensitive layer.

4. A method of phosphorescent reflex exposure in an image reproducing process comprising the steps of:
 (a) positioning an image-original document facing the phospor coating on a phosphor-coated opaque screen,
 (b) illuminating the image-original document with a source of phosphor-activating radiation applied through the interstices of the phosphor-coated screen from the opaque side thereof to effect activation of the phosphor selectively in the image pattern by reflection from the document surface, and
 (c) following discontinuation of the illumination, positioning a photosensitive member facing the opaque side of the phosphor-coated screen to receive phosphorsecent radiation selectively reflected from said original document through the interstices of the phospor-coated screen to expose said photosensitive member.

5. A method of emphasizing contrast in a reflex xerographic image exposure process comprising the steps of:
 (a) forming a sandwich comprising an original image document to be reproduced having an image surface, a first screen facing said document having areas of activatable phosphor and a second screen of opaque areas in register with the areas of phosphor in said first screen, said second screen having a free surface,
 (b) illuminating said free surface with phosphor activating radiation which passes through an interstices of said first and said second screens and is reflected by said original to selectively activate areas of said activatable phosphor in accordance with the image on said document, and
 (c) after discontinuing said last recited step, positioning a xerographic plate having a sensitive surface against said free surface keeping the total spacing between any of said image surface, said free surface and said sensitive surface within three mils whereby selective phosphorescent radiation from said first screen is selectively reflected by said original to form a high contrast latent electrostatic image on said xerographic plate.

6. A method of high contrast reflex exposure in xerographic reproduction comprising the steps of:
   (a) forming a first sandwich of an image-original document to be reproduced, a first transparent spacing medium, a uniform pattern of radiation-sensitive phosphor areas and a screen providing an opaque backing for each of said phosphor areas,
   (b) illuminating said phosphor areas selectively with activating-radiation modified by the image-original, and
   (c) after discontinuing said last recited step forming a second sandwich including said first sandwich, a second transparent spacing medium, and a sensitive xerographic plate whereby the phosphorescence from the selectively activated phosphor areas is reflected by said image-original and selectively illuminates said xerographic plate.

7. A method of high contrast reflex exposure according to claim 6 in which at least one of said first transparent spacing medium and said second transparent spacing medium is a solid support member.

8. A method of high contrast reflex exposure according to claim 6 in which said first transparent spacing medium comprises a transparent plastic and said second transparent spacing medium comprises a transparent backing of a xerographic plate.

9. A method of high contrast reflex exposure according to claim 6 in which both said radiation and said selective phosphorescence are modified by said image-original by reflection against said image-original.

References Cited by the Examiner

UNITED STATES PATENTS

| 2,152,353 | 3/1939 | Lewin | 96—27 |
| 2,295,632 | 9/1942 | Buskes | 96—116 |
| 2,441,010 | 5/1948 | Dobbins | 96—47 |
| 2,482,814 | 9/1949 | Urbach | 96—27 |
| 2,602,741 | 7/1952 | Vander Grinten et al. | 96—47 |
| 2,856,535 | 10/1958 | Vyverberg | 96—1 |
| 2,917,385 | 12/1959 | Byrne | 96—1 |
| 2,920,959 | 1/1960 | Hull | 96—35 |
| 2,988,978 | 6/1961 | Craig | 96—27 |
| 3,094,910 | 6/1963 | Wagner et al. | 96—1 |

NORMAN G. TORCHIN, *Primary Examiner.*

A. LIBERMAN, D. D. PRICE, *Assistant Examiners.*